(12) United States Patent
Hatakeyama et al.

(10) Patent No.: US 10,069,337 B2
(45) Date of Patent: Sep. 4, 2018

(54) PORTABLE TERMINAL CHARGING DEVICE AND AUTOMOBILE EQUIPPED WITH SAME

(71) Applicant: Panasonic Intellectual Property Management Co., Ltd., Osaka (JP)

(72) Inventors: Ken Hatakeyama, Kanagawa (JP); Yuto Yamanishi, Kanagawa (JP); Tomohiro Ota, Hyogo (JP); Takeshi Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 251 days.

(21) Appl. No.: 14/910,749

(22) PCT Filed: Jul. 30, 2014

(86) PCT No.: PCT/JP2014/003990
§ 371 (c)(1),
(2) Date: Feb. 8, 2016

(87) PCT Pub. No.: WO2015/025478
PCT Pub. Date: Feb. 26, 2015

(65) Prior Publication Data
US 2016/0197509 A1    Jul. 7, 2016

(30) Foreign Application Priority Data
Aug. 21, 2013  (JP) ................. 2013-171041

(51) Int. Cl.
*H02J 7/00* (2006.01)
*H02J 50/10* (2016.01)
(Continued)

(52) U.S. Cl.
CPC .............. *H02J 50/10* (2016.02); *G01V 3/105* (2013.01); *H02J 50/60* (2016.02)

(58) Field of Classification Search
USPC ......................................................... 320/108
See application file for complete search history.

(56) References Cited

U.S. PATENT DOCUMENTS

| 2010/0270867 A1 | 10/2010 | Abe | |
| 2012/0091948 A1* | 4/2012 | Shinde | B60R 7/04 320/108 |

(Continued)

FOREIGN PATENT DOCUMENTS

| EP | 2 590 300 | 5/2013 |
| JP | 2010-259172 | 11/2010 |

(Continued)

OTHER PUBLICATIONS

International Search Report of PCT application No. PCT/JP2014/003990 dated Sep. 16, 2014.

(Continued)

*Primary Examiner* — Robert Grant
(74) *Attorney, Agent, or Firm* — Wenderoth, Lind & Ponack, L.L.P.

(57) ABSTRACT

A portable terminal charging device includes a large diameter detection coil arranged between a charging coil and a portable terminal, and a further detection coil arranged inward of the large diameter detection coil and having a smaller diameter than the large diameter detection coil. The large diameter detection coil and the further detection coil detect a state of a foreign metal object by finding out a decrease in the magnetic flux of an inward section of the charging coil and conversely finding out an increase in the magnetic flux of an outward section thereof, if the foreign metal object is present between a portable terminal installation unit of a support plate and the portable terminal.

17 Claims, 12 Drawing Sheets

(51) Int. Cl.
 *H02J 50/60* (2016.01)
 *G01V 3/10* (2006.01)

(56) References Cited

U.S. PATENT DOCUMENTS

| | | | | |
|---|---|---|---|---|
| 2013/0099592 A1* | 4/2013 | Abe | .................. | H02J 5/005 |
| | | | | 307/104 |
| 2013/0162202 A1* | 6/2013 | Wang | .................. | G06F 3/044 |
| | | | | 320/108 |
| 2013/0169062 A1 | 7/2013 | Maikawa et al. | | |

FOREIGN PATENT DOCUMENTS

| | | |
|---|---|---|
| JP | 2012-016125 | 1/2012 |
| JP | 2012-249401 | 12/2012 |
| JP | 2013-034292 | 2/2013 |
| WO | 2007/147199 | 12/2007 |

OTHER PUBLICATIONS

Extended European Search Report dated Jul. 11, 2016 in corresponding European Patent Application No. 14837938.1.

\* cited by examiner

[FIG. 1]
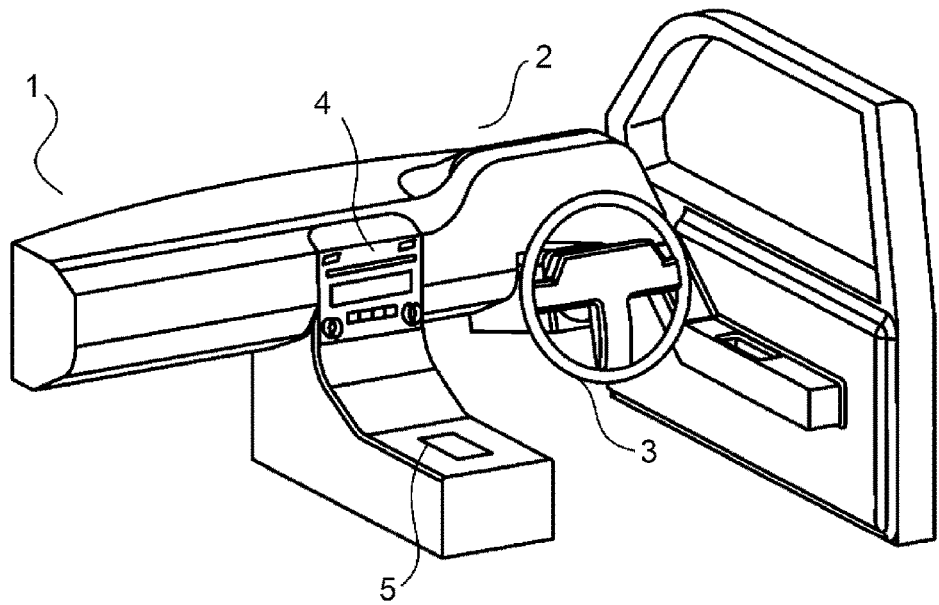
[FIG. 2]
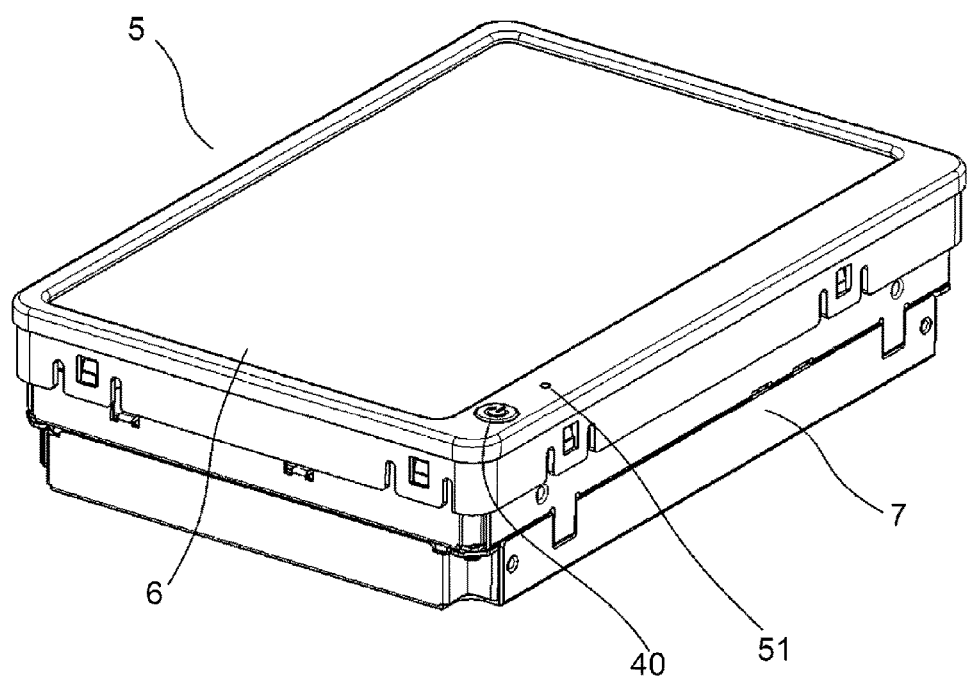

[FIG. 3]
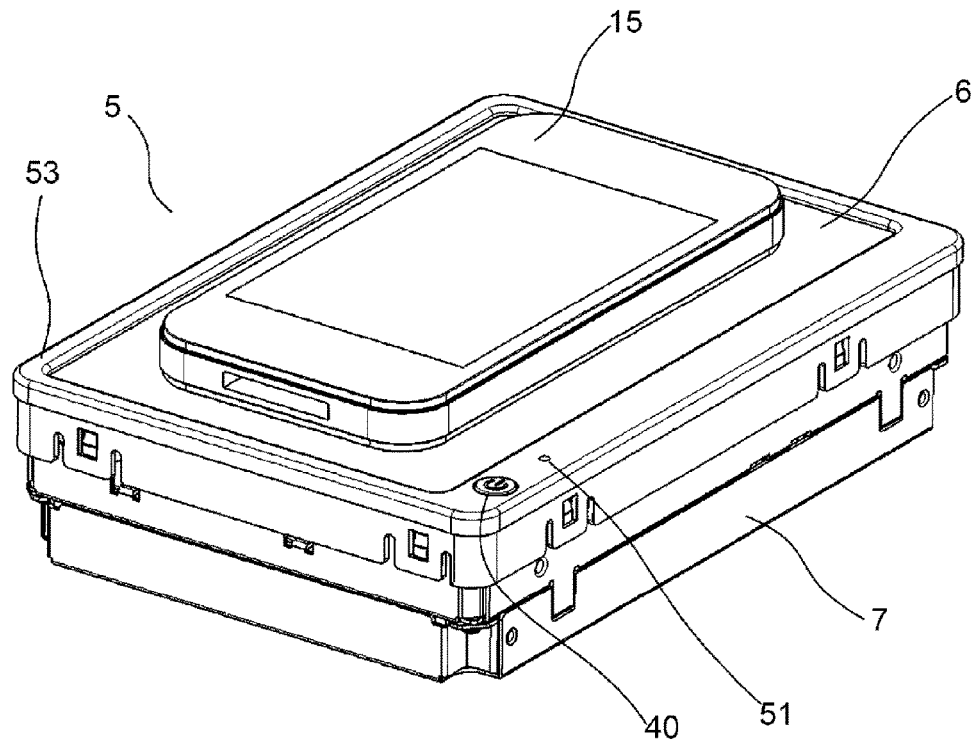
[FIG. 4]
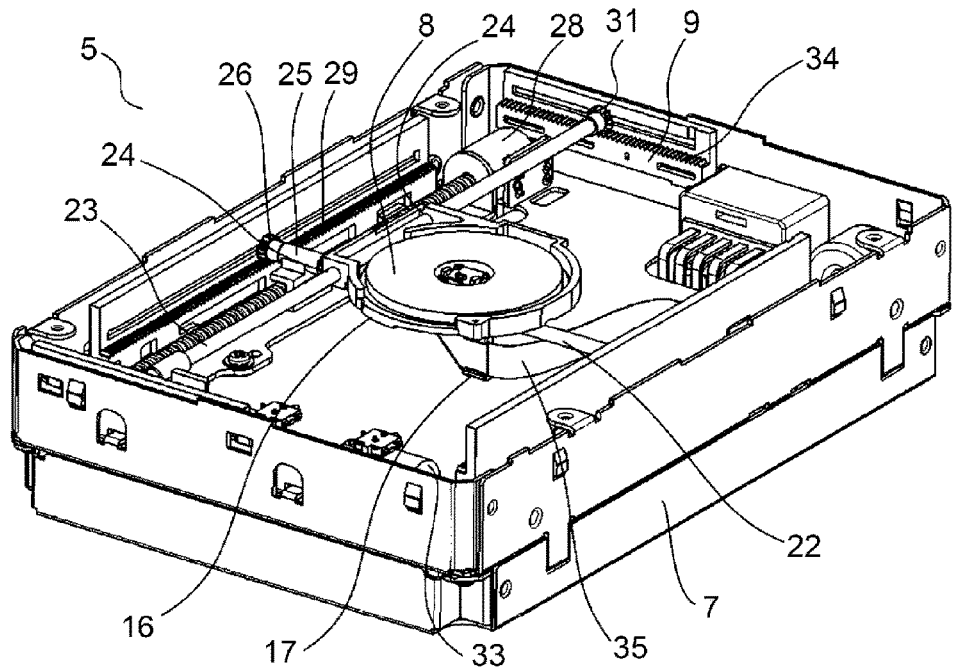

[FIG. 5]
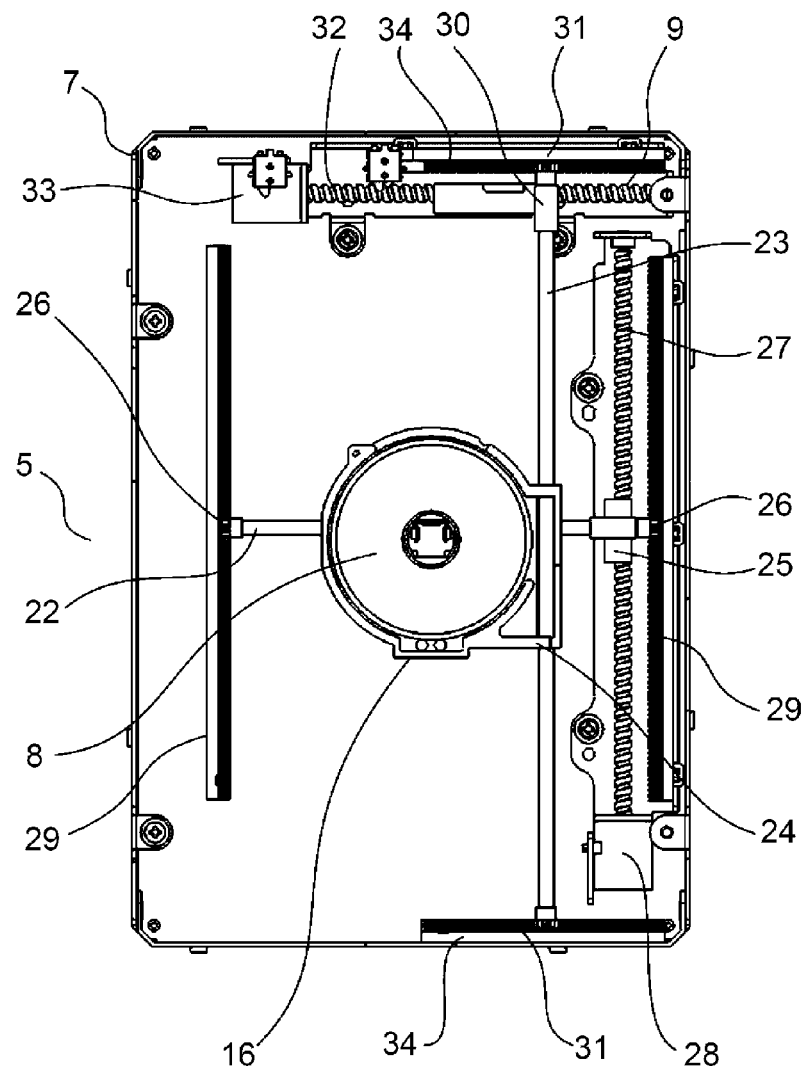

[FIG. 6]
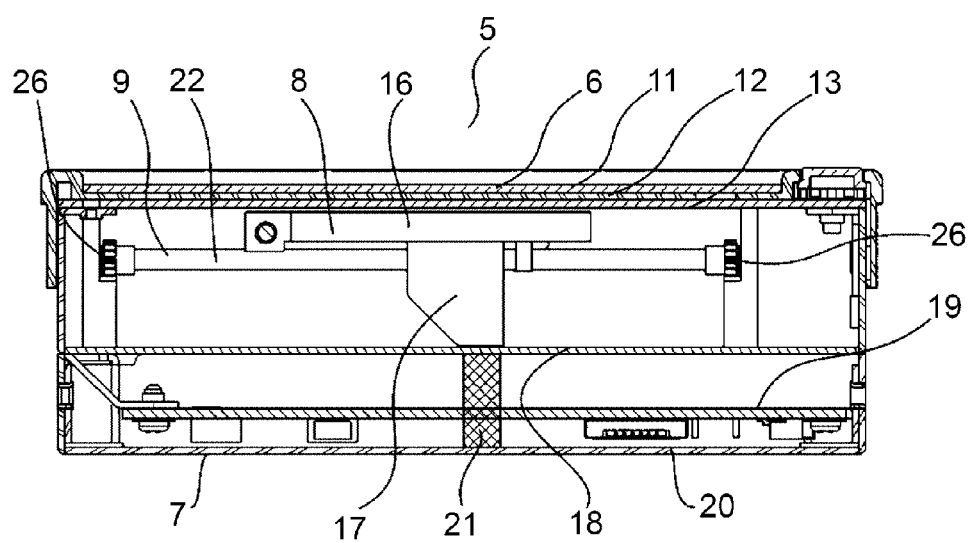

[FIG. 7]
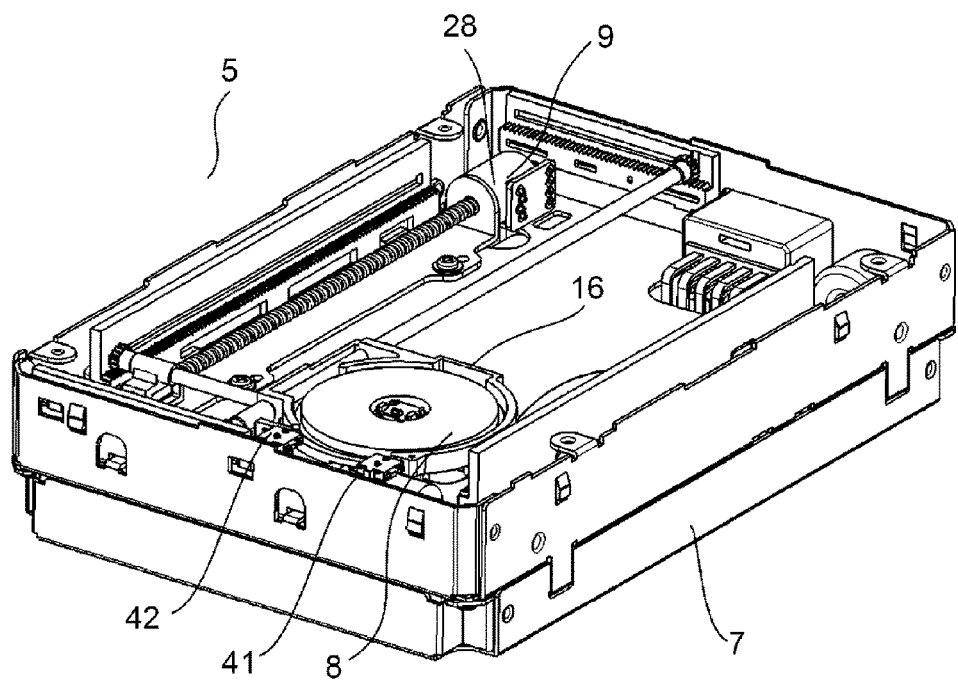

[FIG. 8]
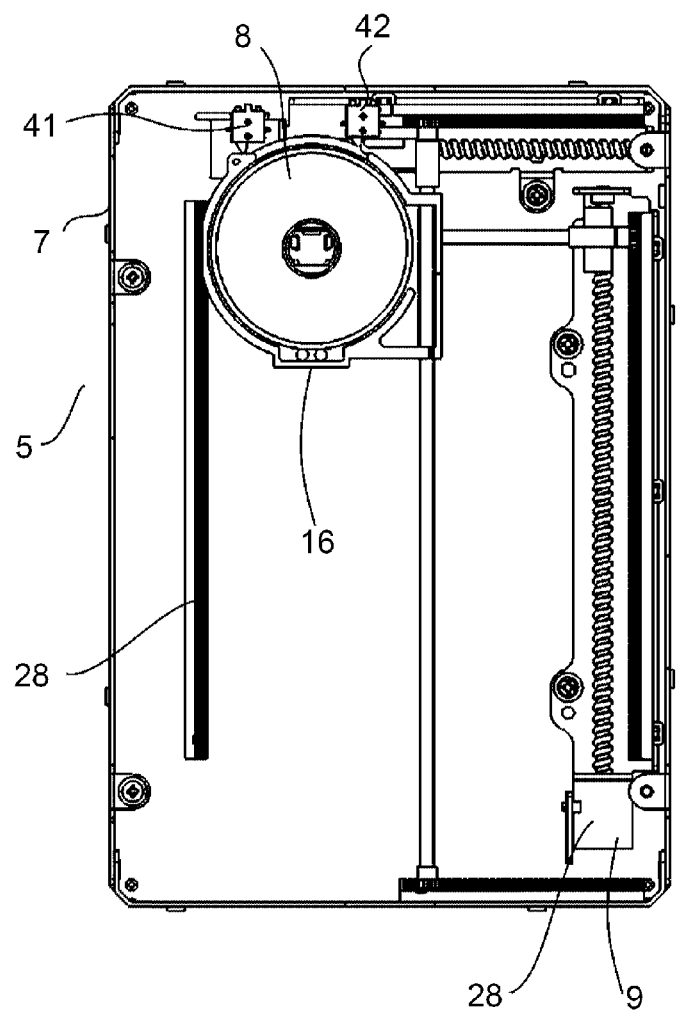

[FIG. 9]
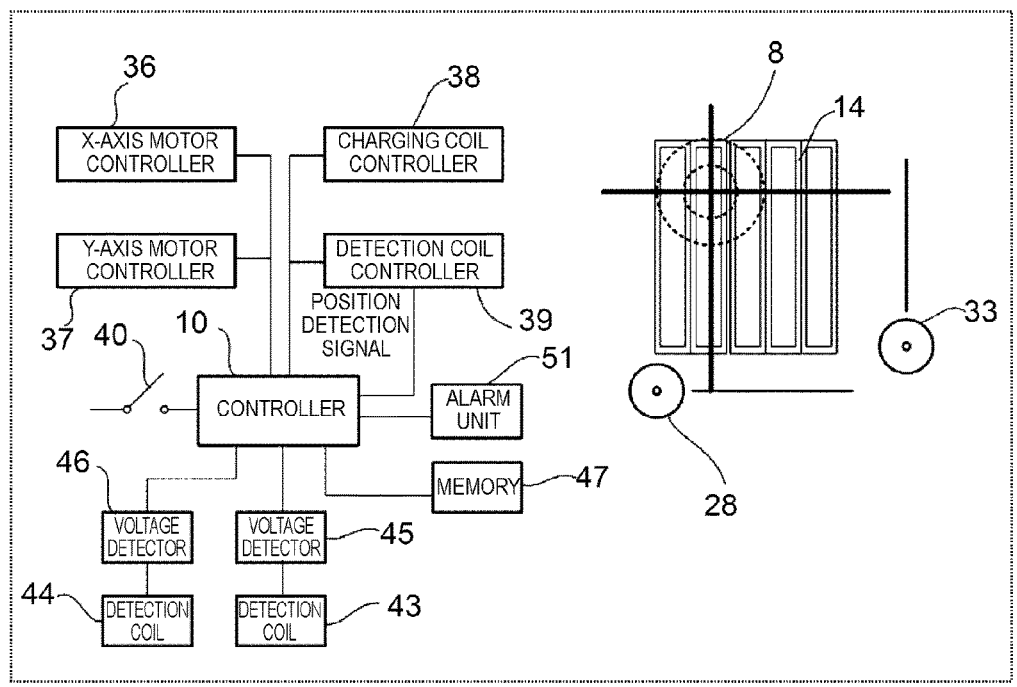

[FIG. 10]
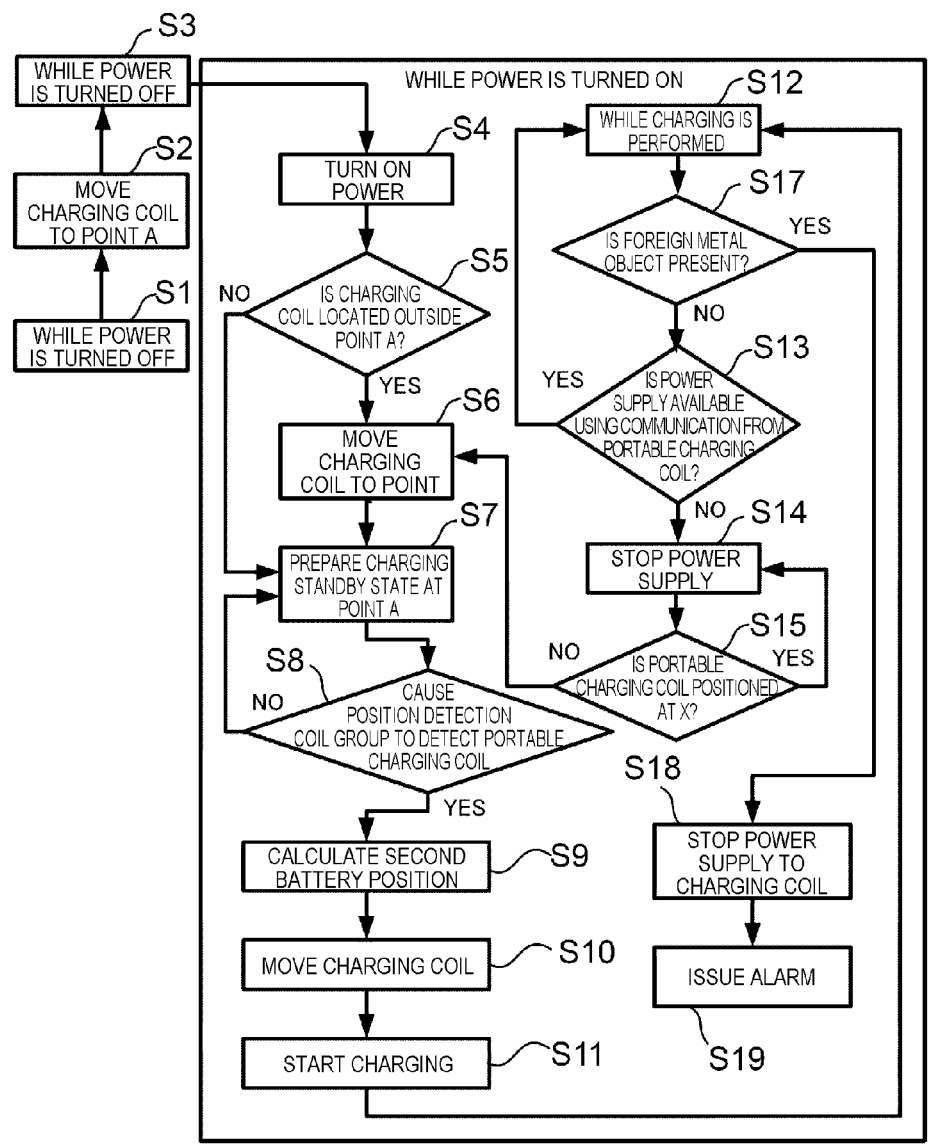

[FIG. 11]
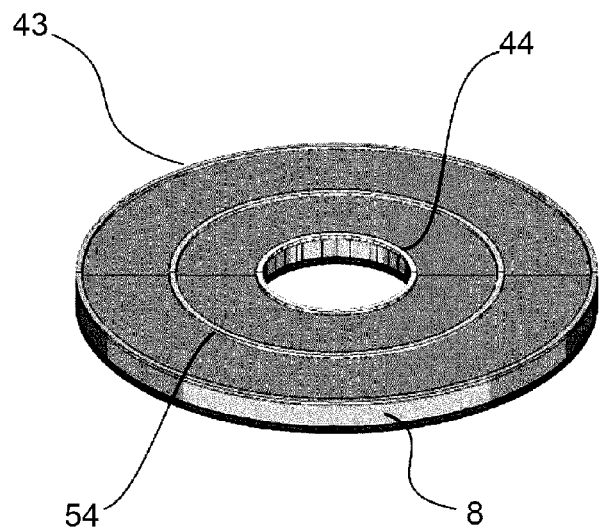
[FIG. 12]
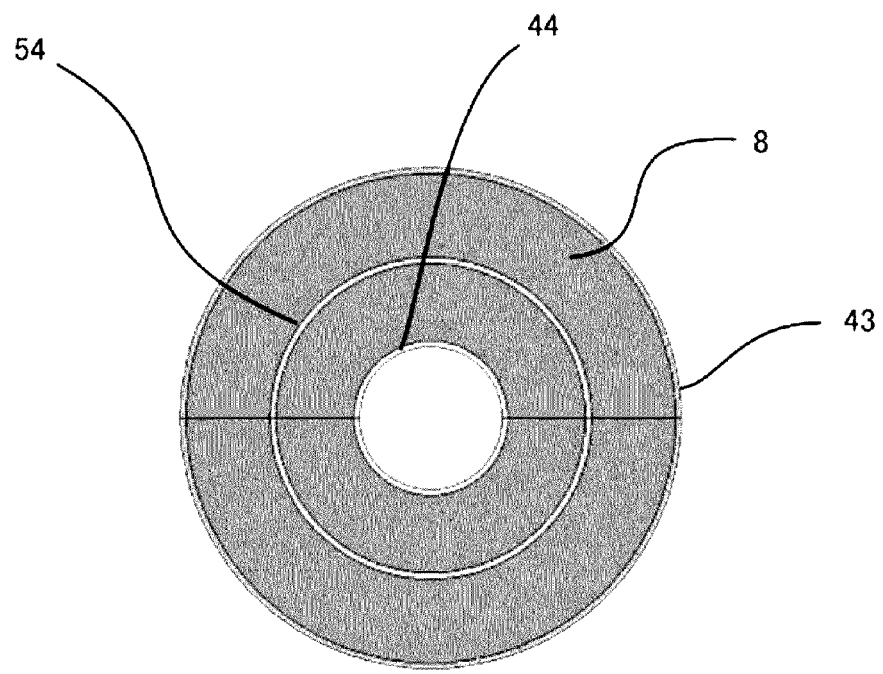

[FIG. 13]
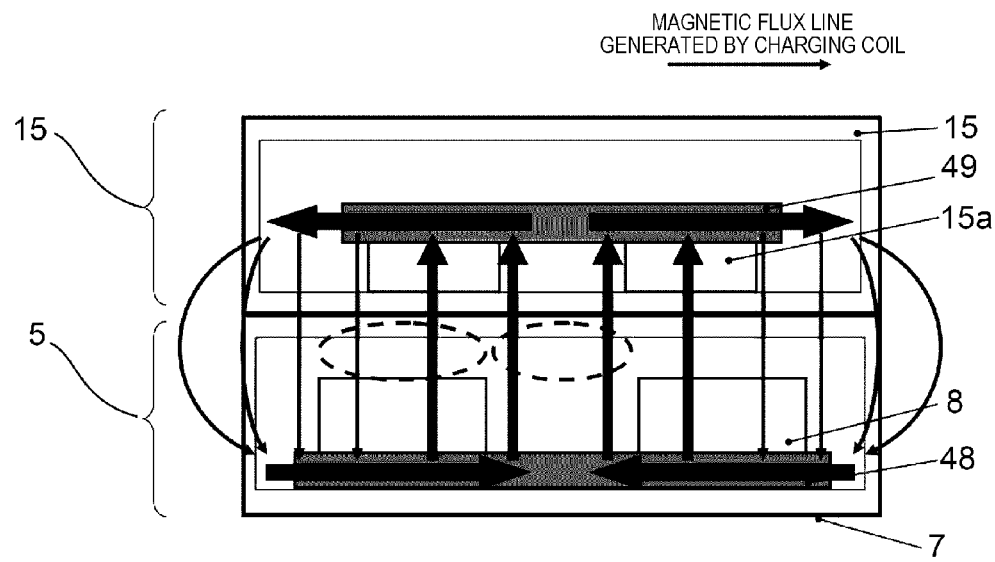
[FIG. 14]
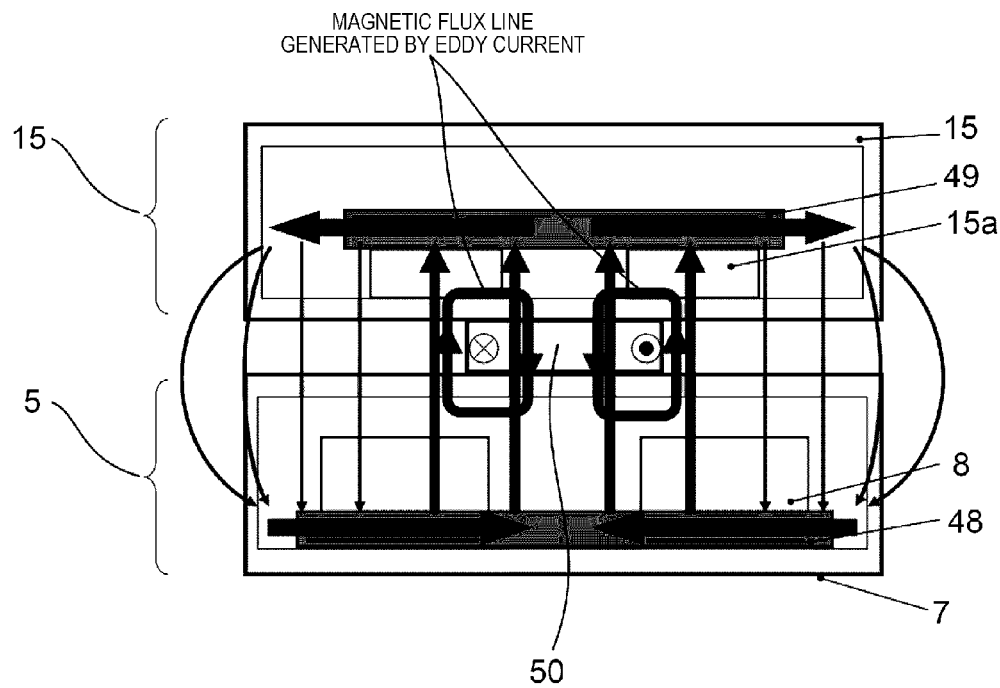

[FIG. 15]
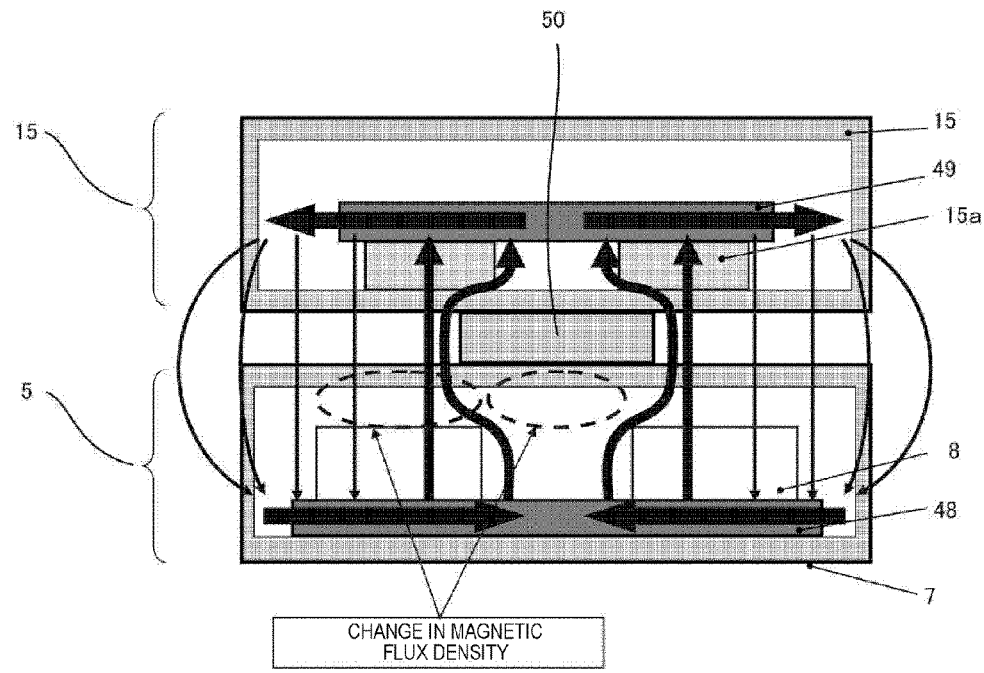
[FIG. 16]
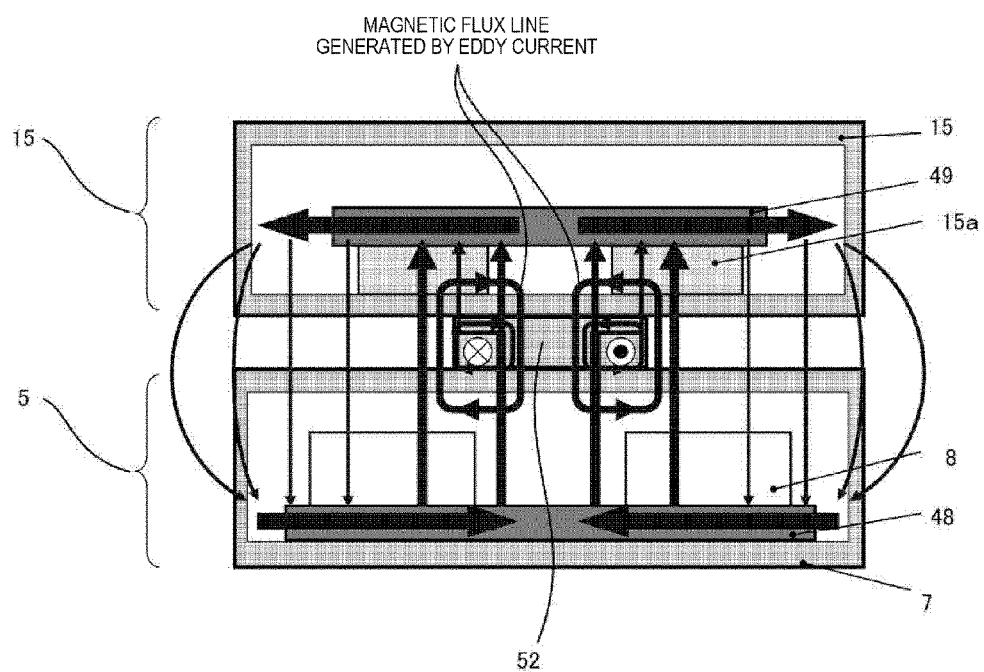

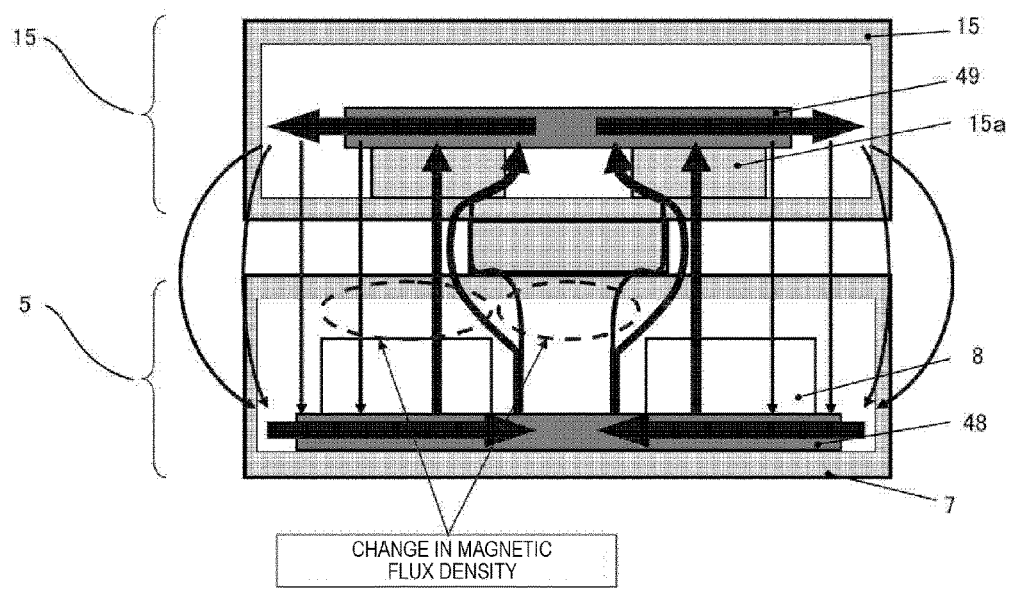
[FIG. 17]

PORTABLE TERMINAL CHARGING DEVICE AND AUTOMOBILE EQUIPPED WITH SAME

FIELD OF THE INVENTION

The present invention relates to a portable terminal charging device for charging a portable terminal such as a portable phone, and an automobile equipped with the same.

DESCRIPTION OF THE RELATED ART

A portable terminal such as a portable phone needs to fulfill a very high level function, and consequently, much more power is consumed.

Therefore, although charging is required at various places including an automobile interior, a portable terminal charging device which enables so-called contactless charging without using a cable has recently attracted attention.

That is, this portable terminal charging device includes a support plate whose front surface side serves as a portable terminal installation unit, and a charging coil arranged on a rear surface side of the support plate so as to face the support plate. If a portable terminal is placed on the portable terminal installation unit, the magnetic flux output from the charging coil enables the portable terminal to be charged (for example, a similar one is disclosed in Japanese Patent Unexamined Publication No 2012-16125).

In the related art, for example, when a foreign metal object such as a coin is placed on the portable terminal installation unit of the support plate and the portable terminal is further placed thereon, a foreign object detection unit detects the foreign metal object. In this manner, power supply to the charging coil is stopped, for example.

Therefore, it is possible to prevent the temperature of the foreign object from rising due to the magnetic flux output from the charging coil.

However, in the related art, the foreign object detection unit is configured to include a metal detection antenna coil and an oscillation circuit connected thereto. Thus, it is not preferable to adopt the configuration in terms of versatility.

That is, in the related art, the foreign object is detected by utilizing the fact that a transmitting state of the transmission circuit is changed if the foreign metal object is present. However, according to the configuration, the oscillation circuit is in a very delicate setting state. Accordingly, the configuration is useful when charging the portable terminal whose characteristics are known in advance. However, when charging the portable terminal whose characteristics are not known, an oscillating state of the portable terminal itself is changed. As a result, the portable terminal cannot be charged in some cases. Therefore, it is not preferable to adopt the configuration in terms of versatility.

For example, the portable terminal charging device is installed in an automobile interior of an automobile, and an unspecified number of persons attempt to charge various types of portable terminals in many cases. In this state, depending on a model of the portable terminal, the portable terminal cannot be charged, thereby resulting in poor usability.

SUMMARY OF THE INVENTION

In view of the above, an object of the present invention is to improve usability.

In order to achieve the object, the present invention achieves the intended object by adopting the following configuration. A portable terminal charging device includes a support plate whose front surface side serves as a portable terminal installation unit, a charging coil that is arranged on a rear surface side of the support plate so as to face the support plate, a first detection coil that is arranged between the charging coil and the portable terminal installation unit of the support plate, and that has a large diameter, a second detection coil that is arranged inward of the first detection coil, and that has a smaller diameter than the first detection coil, and a controller that is connected to the first and second detection coils. The controller performs a safety operation if a ratio (V2/V1) of a second voltage (V2) detected by the second detection coil to a first voltage (V1) detected by the first detection coil becomes smaller than a set value. Therefore, an initial object will be achieved.

As described above, according to the present invention, a portable terminal charging device includes a support plate whose front surface side serves as a portable terminal installation unit, a charging coil that is arranged on a rear surface side of the support plate so as to face the support plate, a first detection coil that is arranged between the charging coil and the portable terminal installation unit of the support plate, and that has a large diameter, a second detection coil that is arranged inward of the first detection coil, and that has a smaller diameter than the first detection coil, and a controller that is connected to the first and second detection coils. The controller performs a safety operation if a ratio (V2/V1) of a second voltage (V2) detected by the second detection coil to a first voltage (V1) detected by the first detection coil becomes smaller than a set value. Therefore, usability is improved.

That is, the present invention adopts a configuration in which the first and second detection coils detect a state of a foreign metal object by finding out a decrease in the magnetic flux of an inward section of the charging coil and conversely finding out an increase in the magnetic flux of an outward section thereof, if the foreign metal object is present between the portable terminal installation unit and the portable terminal.

That is, when the first detection coil having the large diameter detects the increase in the magnetic flux of the outward section, the first voltage (V1) increases. Conversely, if the magnetic flux of the inward section decreases, the second voltage (V2) detected by the second detection coil having the small diameter decreases. Accordingly, the ratio (V2/V1) becomes sufficiently smaller than the set value. As a result, the presence of the foreign metal object can be reliably detected, thereby enabling the safety operation to be reliably performed when the foreign metal object is present.

This operation for detecting the foreign metal object is not substantially affected by types of the portable terminal to be charged. Therefore, various portable terminals can be charged in a versatile manner, thereby improving usability.

BRIEF DESCRIPTION OF DRAWINGS

FIG. 1 is a perspective view illustrating a state where a portable terminal charging device according to an exemplary embodiment of the present invention is installed in an automobile interior of an automobile.

FIG. 2 is a perspective view of the portable terminal charging device.

FIG. 3 is a perspective view of the portable terminal charging device.

FIG. 4 is a perspective view illustrating a state where the portable terminal charging device is partially removed.

FIG. 5 is a plan view illustrating a state where the portable terminal charging device is partially removed.

FIG. 6 is a sectional view of the portable terminal charging device.

FIG. 7 is a perspective view illustrating a state where the portable terminal charging device is partially removed.

FIG. 8 is a plan view illustrating a state where the portable terminal charging device is partially removed.

FIG. 9 is a control block diagram of the portable terminal charging device.

FIG. 10 is an operation flowchart of the portable terminal charging device.

FIG. 11 illustrates a detection coil of the portable terminal charging device.

FIG. 12 illustrates the detection coil of the portable terminal charging device.

FIG. 13 illustrates the detection coil of the portable terminal charging device.

FIG. 14 illustrates an operation of the portable terminal charging device.

FIG. 15 illustrates an operation of the portable terminal charging device.

FIG. 16 illustrates an operation of the portable terminal charging device.

FIG. 17 illustrates an operation of the portable terminal charging device.

DETAILED DESCRIPTION OF THE PREFERRED EMBODIMENTS

Hereinafter, an example where an automobile is equipped with a portable terminal charging device according to an exemplary embodiment of the present invention will be described with reference to the accompanying drawings.

Exemplary Embodiment 1

In FIG. 1, steering wheel 3 is installed in a front section of automobile interior 2 in automobile 1.

Electronic device 4 for listening to music, reproducing video, and projecting car navigation images is installed beside steering wheel 3.

Furthermore, portable terminal charging device 5 is installed behind electronic device 4 in automobile interior 2.

As illustrated in FIGS. 2 to 8, portable terminal charging device 5 includes box-shaped main body case 7 whose upper surface has support plate 6 arranged thereon, charging coil 8 disposed in main body case 7 so as to be horizontally movable in a state of facing a lower surface side of support plate 6, drive unit 9 that horizontally moves charging coil 8 so as to face the lower surface of support plate 6, and a controller (refer to the reference numeral 10 in FIG. 9) connected to drive unit 9 and charging coil 8.

Hereinafter, each unit will be described in detail.

First, support plate 6 will be described.

As illustrated in FIG. 6, support plate 6 is configured so that front surface plate 11, intermediate plate 12, and rear surface plate 13 are combined with each other.

Front surface plate 11 and rear surface plate 13 are formed of a synthetic resin, and further, intermediate plate 12 is formed of ceramic. That is, a configuration is adopted in which the magnetic flux output from charging coil 8 can pass through support plate 6 in a direction toward portable terminal 15.

Position detection coil 14 (an example of a position detection unit) illustrated in FIG. 9 is disposed on a surface of intermediate plate 12.

Position detection coil 14 is used in Citation List (Japanese Patent Unexamined Publication No. 2009-247194), and detects that portable terminal 15 as illustrated in FIG. 3 is placed at any position of a portable terminal installation unit which is an upper surface of support plate 6.

The present exemplary embodiment adopts a configuration in which position detection coil 14 is used so as to detect that portable terminal 15 as illustrated in FIG. 3 is placed at any position on the upper surface of support plate 6, and subsequently drive unit 9 moves charging coil 8 to a position of facing a portable charging coil (refer to the reference numeral 15a in FIG. 13) of portable terminal 15.

Next, charging coil 8 will be described.

As is understood from FIGS. 4 and 5, charging coil 8 is configured to have an annular shape in which a wire is wound into a spiral shape, and is held in a state where an outer peripheral side and a lower surface side thereof are covered with holding body 16 formed of a synthetic resin.

As illustrated in FIG. 6, support leg 17 extending downward from charging coil 8 is integrally formed on a lower surface of holding body 16 by using a synthetic resin.

A gap of 0.3 mm is disposed between the lower surface of support leg 17 and the upper surface of metal-made support plate 18 arranged below support leg 17. Accordingly, when charging coil 8 is moved in a normal state, the lower surface of support leg 17 does not come into contact with the upper surface of support plate 18.

Control board 19 and lower surface plate 20 of main body case 7 are arranged below support plate 18, and support body 21 penetrating through control board 19 is disposed between the lower surface of support plate 18 and the upper surface of lower surface plate 20.

Next, drive unit 9 will be described.

As illustrated in FIGS. 4 and 5, drive unit 9 has X-axis direction drive shaft 22 and Y-axis direction drive shaft 23. Each intermediate portion of X-axis direction drive shaft 22 and Y-axis direction drive shaft 23 engages with holding body 16 outside a charging coil holding portion of holding body 16.

That is, a through-hole (not illustrated) through which X-axis direction drive shaft 22 penetrates and through-hole 24 through which Y-axis direction drive shaft 23 penetrates are disposed at a predetermined vertical interval and in a crossed state, in holding body 16. X-axis direction drive shaft 22 and Y-axis direction drive shaft 23 penetrate through the through-holes, thereby being brought into an engagement state.

Worm wheel 25 is disposed on one end side of X-axis direction drive shaft 22. Gear 26 is disposed in one end, and gear 26 is also disposed in the other end.

Worm wheel 25 engages with worm 27, and worm 27 is connected to motor 28.

Each gear 26 on both sides engages with gear plate 29.

Therefore, if motor 28 is driven, worm 27 rotates. The rotation causes worm wheel 25 to move in an X-axis direction together with X-axis direction drive shaft 22, thereby moving charging coil 8 to move in the X-axis direction.

Worm wheel 30 is disposed on one end side of Y-axis direction drive shaft 23. Gear 31 is disposed in one end, and gear 31 is also disposed in the other end.

Worm wheel 30 engages with worm 32, and worm 32 is connected to motor 33.

Each gear 31 on both sides engages with gear plate 34.

Therefore, if motor 33 is driven, worm 32 rotates. The rotation causes worm wheel 30 to move in a Y-axis direction together with Y-axis direction drive shaft 23, thereby moving charging coil 8 to move in the Y-axis direction.

The reference numeral 35 illustrated in FIG. 4 represents a flexible wire for supplying power to charging coil 8. An end portion of flexible wire 35 is fixed to a side surface of support leg 17 described above.

As illustrated in FIG. 9, motor 28 is connected to controller 10 via X-axis motor controller 36, and motor 33 is connected to controller 10 via Y-axis motor controller 37.

Charging coil 8 is connected to controller 10 via charging coil controller 38, and further, position detection coil 14 is connected to controller 10 via detection coil controller 39.

According to the above-described configuration, in the present exemplary embodiment, power switch 40 disposed on an outer peripheral portion of support plate 6 of main body case 7 illustrated in FIG. 2 is turned off (S1 in FIG. 10), controller 10 moves charging coil 8 to the center (hereinafter, referred to as point A) of main body case 7 as illustrated in FIGS. 4 to 6 (S2 in FIG. 10). Thereafter, power is brought into a turned-off state (S3 in FIG. 10).

That is, in a state where portable terminal 15 is not placed on support plate 6 of main body case 7 as illustrated in FIG. 2, support plate 6 is in a state of being exposed to automobile interior 2 as illustrated in FIG. 1.

Therefore, in some cases, a hand is erroneously laid on support plate 6. In this case, support plate 6 is brought into an overloaded state.

Therefore, according to the present exemplary embodiment, as illustrated in FIGS. 4 to 6, charging coil 8 is moved to the center of main body case 7 so that the above-described overload is withstood by charging coil 8, holding body 16, support leg 17, and support plate 18.

That is, in this state where the overload is applied onto support plate 6, support plate 6 is slightly bent downward. However, in this state, charging coil 8, holding body 16, and support leg 17 are also moved downward, and the lower surface of support leg 17 comes into contact with the upper surface of support plate 18.

As a result, the above-described overload is withstood by support plate 18 via support plate 6, charging coil 8, holding body 16, and support leg 17. This can prevent damage to support plate 6 or charging coil 8.

The present exemplary embodiment adopts a configuration in which the lower surface side of support plate 18 is supported by lower surface plate 20 of main body case 7 via support body 21 in order to improve the strength against the overload.

If this overload is removed, support plate 6 is elastically restored upward, and charging coil 8 and holding body 16 are also restored upward since X-axis direction drive shaft 22 and Y-axis direction drive shaft 23 are elastically restored. Accordingly, the lower surface of support leg 17 is brought into a state of being arranged on the upper surface of support plate 18 with a gap therebetween.

Therefore, there is no possibility of hindering the subsequent movement of charging coil 8.

When portable terminal 15 is charged, power switch 40 illustrated in FIG. 3 is first turned on (S4 in FIG. 10), and portable terminal 15 is placed on the upper surface of support plate 6.

Even in this state, according to the present exemplary embodiment, controller 10 first confirms whether or not charging coil 8 is present at point A (S5 in FIG. 10).

This confirmation can be determined, based on a drive amount of motors 28 and 33 which is stored in X-axis motor controller 36 and Y-axis motor controller 37.

When it is determined that charging coil 8 is not present at point A, controller 10 moves charging coil 8 to point A (S6 in FIG. 10), thereby bringing charging coil into a charging standby state at point A (S7 in FIG. 10).

Next, controller 10 uses position detection coil 14 so as to detect that portable terminal 15 as illustrated in FIG. 3 is placed at any position on the upper surface of support plate 6 (S8 and S9 in FIG. 10).

The place on which portable terminal 15 is placed is a place of a portable charging coil (not illustrated) actually incorporated in portable terminal 15.

Thereafter, controller 10 drives motors 28 and 33 via X-axis motor controller 36 and Y-axis motor controller 37 so as to move charging coil 8 to the detected portable charging coil (not illustrated) belonging to portable terminal 15 (S10 in FIG. 10). Thereafter, charging starts via charging coil controller 38 (S11 and S12 in FIG. 10).

During the charging, the same operation as disclosed in Citation List (Japanese Patent Unexamined Publication No. 2009-247194) above is performed so as to determine whether or not the charging needs to be continuously performed (whether or not the charging is completed) (S13 in FIG. 10). If the charging is completed (fully charged), controller 10 completes the charging operation (S14 in FIG. 10).

If this charging operation is completed, controller 10 confirms whether or not charging coil 8 is present at point A (S15 in FIG. 10). Thereafter, controller 10 causes charging coil 8 to return to point A (S6 in FIG. 10).

This confirmation can be determined, based on a drive amount of motors 28 and 33 which is stored in X-axis motor controller 36 and Y-axis motor controller 37.

When charging coil 8 cannot return to point A by controller 10, for example, when due to a certain impact during the operation, a position calculated based on the drive amount of motors 28 and 33 which is stored in X-axis motor controller 36 and Y-axis motor controller 37 and an actual position measured by position detection coil 14 are misaligned with each other, controller 10 causes the operations illustrated in FIGS. 7 and 8 to be performed.

That is, controller 10 drives motors 28 and 33 via X-axis motor controller 36 and Y-axis motor controller 37 so as to move charging coil 8 to a corner inside main body case 7.

Switches 41 and 42 are present in the corner portion. If charging coil 8 is moved to the corner inside main body case 7, switches 41 and 42 are operated. In this manner, controller 10 determines that charging coil 8 is moved to an initial value.

In this state, an operation amount of motors 28 and 33 operated by X-axis motor controller 36 and Y-axis motor controller 37 is also set to the initial value so as to perform a position control again from the initial value.

Next, the most significant characteristics according to the present exemplary embodiment will be described.

The most significant characteristics according to the present exemplary embodiment are as follows. In order to detect a state where a foreign metal object is present on the upper surface (portable terminal installation unit) of support plate 6, large diameter detection coil 43 and detection coil 44 that is arranged inward of detection coil 43 and that has a smaller diameter than detection coil 43 are disposed between charging coil 8 and the portable terminal installation unit of support plate 6 as illustrated in FIGS. 11 and 12.

Specifically, according to the present exemplary embodiment, charging coil 8 is movable depending on a place on which portable terminal 15 is placed. Therefore, a configuration is adopted in which detection coils 43 and 44 are arranged on the upper surface (surface on support plate 6 side) of charging coil 8 so as to be movable together with charging coil 8.

Large diameter detection coil 43 is set to have substantially the same size as the outer diameter of annular charging coil 8 (slightly smaller than the outer diameter of charging coil 8), and small diameter detection coil 44 is set to have substantially the same size as the inner diameter of annular charging coil 8 (slightly larger than the inner diameter of charging coil 8).

Furthermore, large diameter detection coil 43 and small diameter detection coil 44 are respectively connected to controller 10 via voltage detectors 45 and 46 as illustrated in FIG. 9.

Reference numeral 47 in FIG. 9 represents a memory which stores a program for using large diameter detection coil 43 and small diameter detection coil 44 so as to perform an operation illustrated in FIG. 10 or a safety operation against a foreign metal object.

According to the present exemplary embodiment, large diameter detection coil 43 and small diameter detection coil 44 detect a state of the foreign metal object by finding out a decrease in the magnetic flux of an inward section of charging coil 8 and conversely finding out an increase in the magnetic flux of an outward section thereof, if the foreign metal object is present between the portable terminal installation unit (upper surface of support plate 6) and portable terminal 15.

Hereinafter, the state will be described with reference to FIGS. 13 to 17 which are simplified to facilitate the understanding.

FIG. 13 illustrates a state (S12 in FIG. 10) where portable terminal 15 is charged when the foreign metal object is absent between the portable terminal installation unit (upper surface of support plate 6) and portable terminal 15 as illustrated in FIG. 3.

In FIGS. 13 to 17, reference numeral 48 represents a magnetic path forming magnetic body disposed on a lower side (opposite side to portable terminal 15) of charging coil 8 inside main body case 7 of portable terminal charging device 5. Reference numeral 49 represents a magnetic path forming magnetic body disposed on an upper side (opposite side to portable terminal charging device 5) of terminal charging coil 15a inside portable terminal 15.

If a charging operation is performed, the magnetic flux is supplied from charging coil 8 of portable terminal charging device 5 to terminal charging coil 15a of portable terminal 15 as illustrated in FIG. 13. In this manner, portable terminal 15 is charged with a voltage induced in terminal charging coil 15a.

The magnetic flux after passing through a portion of terminal charging coil 15a returns to charging coil 8 via magnetic body 49, a space, and magnetic body 48 as illustrated by an arrow.

In contrast, FIG. 14 illustrates a state where portable terminal 15 is charged when foreign metal object 50 (for example, an aluminum coin) of a non-magnetic body is present between the portable terminal installation unit (upper surface of support plate 6) and portable terminal 15.

In this case, as illustrated in FIG. 14, the magnetic flux passing through foreign metal object 50 induces eddy currents inside foreign metal object 50. As a result, the magnetic flux is generated as illustrated by an arrow in the counterclockwise direction in FIG. 14.

In the magnetic flux illustrated by the arrow in the counterclockwise direction in this way, the magnetic flux in an inward portion (central direction of charging coil 8) flows in the opposite direction to the direction of the magnetic flux flowing from charging coil 8 toward terminal charging coil 15a. In the magnetic flux illustrated by the arrow in the counterclockwise direction, the magnetic flux in an outward portion (opposite direction to the center of charging coil 8) flows in the same direction as the direction of the magnetic flux flowing from charging coil 8 toward terminal charging coil 15a.

As a result, as illustrated in FIG. 15, in the magnetic flux flowing from charging coil 8 toward terminal charging coil 15a, the magnetic flux moving forward in the inner peripheral direction of charging coil 8 is bent outward from the inner peripheral portion of charging coil 8, and thereafter flows toward terminal charging coil 15a.

That is, the magnetic flux in the inner peripheral portion of charging coil 8 decreases, and conversely, the magnetic flux in the outer peripheral portion of charging coil 8 increases.

In this situation, according to the present exemplary embodiment, as described above, large diameter detection coil 43 and small diameter detection coil 44 located inward of detection coil 43 are disposed on the upper surface side (terminal charging coil 15a side) of charging coil 8. Accordingly, detection coils 43 and 44 can detect a state illustrated in FIG. 15.

Specifically, a voltage (V1) detected by large diameter detection coil 43 increases (as a result of the increased magnetic flux and the closer distance from the magnetic flux). Conversely, a voltage (V2) detected by small diameter detection coil 44 decreases (as a result of the decreased magnetic flux and the farther distance from the magnetic flux).

According to the present exemplary embodiment, voltage detector 45 detects a peak voltage of the voltage (V1) detected by large diameter detection coil 43, and voltage detector 46 detects a peak voltage of the voltage (V2) detected by small diameter detection coil 44.

Controller 10 compares a ratio (V2/V1) of the second voltage (V2) to the voltage (V1) with a set value (stored in memory 47, for example, 0.7), thereby performing a safety operation.

As an example, in the state illustrated in FIG. 15 (foreign metal object 50 is present), the voltage (V2) detected by small diameter detection coil 44 is lower than that in the state illustrated in FIG. 13 (foreign metal object 50 is absent) by an amount of 25%, for example.

In contrast, in the state illustrated in FIG. 15 (foreign metal object 50 is present), the voltage (V1) detected by large diameter detection coil 43 is higher than that in the state illustrated in FIG. 13 (foreign metal object 50 is absent) by an amount of 170%, for example.

As a result, the ratio (V2/V1) of the second voltage (V2) to the voltage (V1) in the state illustrated in FIG. 15 (foreign metal object 50 is present) is half or smaller (0.5 or smaller) compared to the state illustrated in FIG. 13 (foreign metal object 50 is absent).

Upon finding out that the detection value (0.5 or smaller) is sufficiently smaller than the set value (0.7) recorded on memory 47, controller 10 detects the presence of foreign metal object 50 (S17 in FIG. 10). Controller 10 immediately stops power supply to charging coil 8 (S18 in FIG. 10), and operates alarm unit 51 illustrated in FIG. 1 (S19 in FIG. 10).

Since alarm unit 51 is connected to controller 10 as illustrated in FIG. 9, alarm unit 51 is lit when foreign metal object 50 is present, thereby giving a notification of an abnormal state.

Next, FIG. 16 illustrates a state where portable terminal 15 is charged when foreign metal object 52 (for example, an iron product) of a magnetic body is present between the portable terminal installation unit (upper surface of support plate 6) and portable terminal 15.

Even in this case, as illustrated in FIG. 16, the magnetic flux passing through foreign metal object 52 induces eddy currents inside foreign metal object 52. As a result, the magnetic flux is generated as illustrated by an arrow in the counterclockwise direction in FIG. 16.

Foreign metal object 52 in this case is the magnetic body. Accordingly, the magnetic flux moving forward into foreign metal object 52 passes through foreign metal object 52, or moves inside foreign metal object 52 in an outward direction, for example. Therefore, since this occurrence is different from that in FIG. 14, the magnetic flux generated by the eddy current is illustrated by double lines in FIG. 16.

However, any one of the magnetic flux generated in this double state flows in the counterclockwise direction in FIG. 16. Accordingly, the magnetic flux in the inward portion (central direction of charging coil 8) flows in the opposite direction to the direction of the magnetic flux flowing from charging coil 8 toward terminal charging coil 15a. The magnetic flux in the outward portion (opposite direction to the center of charging coil 8) which is illustrated by an arrow in the counterclockwise direction flows in the same direction as the direction of the magnetic flux flowing from charging coil 8 toward terminal charging coil 15a.

As a result, as illustrated in FIG. 17, in the magnetic flux flowing from charging coil 8 toward terminal charging coil 15a, the magnetic flux moving forward in the inner peripheral direction of charging coil 8 is bent outward from the inner peripheral portion of charging coil 8, and thereafter flows toward terminal charging coil 15a (in the outer periphery, the magnetic flux partially moves forward into foreign metal object 52).

That is, the magnetic flux in the inner peripheral portion of charging coil 8 decreases, and conversely, the magnetic flux in the outer peripheral portion of charging coil 8 increases.

This situation can be detected by large diameter detection coil 43 and small diameter detection coil 44 which are disposed on the upper surface side (terminal charging coil 15a side) of charging coil 8.

Specifically, the voltage (V1) detected by large diameter detection coil 43 increases (as a result of the increased magnetic flux and the closer distance from the magnetic flux). Conversely, the voltage (V2) detected by small diameter detection coil 44 decreases (as a result of the decreased magnetic flux and the farther distance from the magnetic flux).

The peak voltage of the voltage (V1) detected by large diameter detection coil 43 is detected by voltage detector 45, and the peak voltage of the voltage (V2) detected by small diameter detection coil 44 is detected by voltage detector 46. Controller 10 compares the ratio (V2/V1) of the second voltage (V2) to the voltage (V1) with the set value (stored in memory 47, for example, 0.7), thereby performing a safety operation.

As an example, in the state illustrated in FIG. 16 (foreign metal object 52 is present), the voltage (V2) detected by small diameter detection coil 44 is lower than that in the state illustrated in FIG. 13 (foreign metal object 50 is absent) by an amount of 15%, for example.

In contrast, in the state illustrated in FIG. 16 (foreign metal object 52 is present), the voltage (V1) detected by large diameter detection coil 43 is higher than that in the state illustrated in FIG. 13 (foreign metal object 50 is absent) by an amount of 170%, for example.

As a result, the ratio (V2/V1) of the second voltage (V2) to the voltage (V1) in the state illustrated in FIG. 16 (foreign metal object 52 is present) is half or smaller (0.5 or smaller) compared to the state illustrated in FIG. 13 (foreign metal object 50 is absent).

Finding out that the detection value (0.5 or smaller) is sufficiently smaller than the set value (0.7) recorded on memory 47, controller 10 detects the presence of foreign metal object 52 (S17 in FIG. 10). Controller 10 immediately stops power supply to charging coil 8 (S18 in FIG. 10), and operates alarm unit 51 illustrated in FIG. 1 (S19 in FIG. 10).

Controller 10 causes alarm unit 51 to be lit so as to give a notification of an abnormal state.

As described above, according to the present exemplary embodiment, large diameter detection coil 43 and small diameter detection coil 44 detect a state of a foreign metal object by finding out a decrease in the magnetic flux of an inward section of charging coil 8 and conversely finding out an increase in the magnetic flux of an outward section thereof, even if either foreign metal object 50 of a non-magnetic body or foreign metal object 52 of a magnetic body is present between the portable terminal installation unit (upper surface of support plate 6) and portable terminal 15.

That is, when large diameter detection coil 43 detects the increase in the magnetic flux of the outward section, the voltage (V1) increases. Conversely, if the magnetic flux of the inward section decreases, the voltage (V2) detected by small diameter detection coil 44 decreases. Accordingly, the ratio (V2/V1) becomes sufficiently smaller than the set value. As a result, it is possible to reliably perform a safety operation by reliably detecting the presence of foreign metal objects 50 and 52.

This detection operation (determination based on the ratio of V2/V1) for detecting foreign metal objects 50 and 52 is not substantially affected by whether foreign metal objects 50 and 52 are magnetic bodies or non-magnetic bodies, or by types of portable terminal 15 to be charged. Therefore, various portable terminals 15 can be charged in a versatile manner, thereby considerably improving usability.

In the above-described exemplary embodiment, an example has been described in which portable terminal charging device 5 is disposed in automobile interior 2 of automobile 1.

The reason is that a coin or the like is frequently placed on support plate 6 in automobile 1.

That is, due to the inertia or vibrations in the travelling direction when automobile 1 is driven, portable terminal 15 slips on support plate 6. Thus, as a countermeasure, guard unit 53 protruding upward from support plate 6 is disposed on the outer periphery of support plate 6 as illustrated in FIG. 3.

In this case, a coin becomes less likely to fall down during the driving, thereby causing a user to place the coin on support plate 6.

Therefore, disposing portable terminal charging device 5 according to the present exemplary embodiment in automobile interior 2 of automobile 1 is very useful.

In the present exemplary embodiment, an example has been described in which large diameter detection coil 43 and small diameter detection coil 44 are disposed on the upper surface (terminal charging coil 15a side) of charging coil 8. However, as illustrated in FIGS. 11 and 12, a configuration may also be adopted in which medium size diameter detection coil 54 is disposed between large diameter detection coil 43 and small diameter detection coil 44 and is connected to controller 10.

That is, if medium size diameter detection coil 54 is disposed, detection coils 43, 44, and 54 can be switched for comparison, or situations between detection coils 43 and 54 and between detection coils 54 and 44 can be detected. Furthermore, in the present exemplary embodiment, an example has been described in which charging coil 8 is movable. However, charging coil 8 may be a stationary type. In this case, detection coils 43, 44, and 54 can also be disposed in any place of front surface plate 11, intermediate plate 12, and rear surface plate 13 which configure support plate 6.

As described above, the present invention adopts a configuration in which the first and second detection coils detect a state of a foreign metal object by finding out a decrease in the magnetic flux of the inward section of the charging coil and conversely finding out an increase in the magnetic flux of the outward section thereof, if the foreign metal object is present between the portable terminal installation unit and the portable terminal.

That is, when the first detection coil having the large diameter detects the increase in the magnetic flux of the outward section, the first voltage (V1) increases. Conversely, if the magnetic flux of the inward section decreases, the second voltage (V2) detected by the second detection coil having the small diameter decreases. Accordingly, the ratio (V2/V1) becomes sufficiently smaller than the set value. As a result, the presence of the foreign metal object can be reliably detected, thereby enabling a safety operation to be reliably performed when the foreign metal object is present.

This operation for detecting the foreign metal object is not substantially affected by types of the portable terminal to be charged. Therefore, various portable terminals can be charged in a versatile manner, thereby improving usability.

Therefore, the present invention is expected to be utilized as an automobile or household portable terminal charging device.

The invention claimed is:
1. A portable terminal charging device comprising:
a support plate whose front surface side serves as a portable terminal installation unit;
a charging coil that is arranged on a rear surface side of the support plate so as to face the support plate;
a first detection coil that is arranged between the charging coil and the portable terminal installation unit of the support plate, and that has a large diameter;
a second detection coil that is arranged inward of the first detection coil, and that has a smaller diameter than the first detection coil; and
a controller that is connected to the first and second detection coils,
wherein the controller performs a safety operation if a ratio (V2/V1) of a second voltage (V2) detected by the second detection coil to a first voltage (V1) detected by the first detection coil becomes smaller than a set value, and
wherein the controller stops power supply to the charging coil in order to perform the safety operation if the ration (V2/V1) of the second voltage (V2) detected by the second detection coil to the first voltage (V1) detected by the first detection coil becomes smaller than the set value.

2. The portable terminal charging device of claim 1, wherein the charging coil is formed in an annular shape in which a wire is wound in a spiral shape, and the first and second detection coils are arranged on a surface on a support plate side of the charging coil.

3. The portable terminal charging device of claim 2, wherein the charging coil is movable on the rear surface side of the support plate.

4. The portable terminal charging device of claim 2, wherein the first detection coil is set to have substantially the same size as an outer diameter of the charging coil, and the second detection coil is set to have substantially the same size as an inner diameter of the charging coil.

5. The portable terminal charging device of claim 1, wherein a third detection coil is arranged between the first and second detection coils.

6. The portable terminal charging device of claim 1, wherein the controller operates an alarm unit connected to the controller in order to perform the safety operation, if the ratio (V2/V1) of the second voltage (V2) detected by the second detection coil to the first voltage (V1) detected by the first detection coil becomes smaller than the set value.

7. The portable terminal charging device of claim 1, wherein each of the first and second detection coils is connected to a voltage detector for measuring a peak voltage, and the voltage detector is connected to the controller.

8. An automobile comprising:
the portable terminal charging device of claim 1,
wherein the portable terminal charging device is arranged in an automobile interior so that an upper surface side of the portable terminal charging device serves as the portable terminal installation unit.

9. The automobile of claim 8,
wherein a guard unit protruding upward beyond the support plate is disposed on an outer periphery of the support plate.

10. A portable terminal charging device comprising:
a support plate whose front surface side serves as a portable terminal installation unit;
a charging coil that is arranged on a rear surface side of the support plate so as to face the support plate;
a first detection coil that is arranged between the charging coil and the portable terminal installation unit of the support plate, and that has a large diameter;
a second detection coil that is arranged inward of the first detection coil, and that has a smaller diameter than the first detection coil; and
a controller that is connected to the first and second detection coils,
wherein the controller performs a safety operation if a ratio (V2/V1) of a second voltage (V2) detected by the second detection coil to a first voltage (V1) detected by the first detection coil becomes smaller than a set value, and
wherein the controller operates an alarm unit connected to the controller in order to perform the safety operation if the ratio (V2/V1) of the second voltage (V2) detected by the second detection coil to the first voltage (V1) detected by the first detection coil becomes smaller than the set value.

11. The portable terminal charging device of claim 10, wherein the charging coil is formed in an annular shape in which a wire is wound in a spiral shape, and the first and second detection coils are arranged on a surface on a support plate side of the charging coil.

12. The portable terminal charging device of claim 11, wherein the charging coil is movable on the rear surface side of the support plate.

13. The portable terminal charging device of claim 11, wherein the first detection coil is set to have substantially the same size as an outer diameter of the charging coil, and the second detection coil is set to have substantially the same size as an inner diameter of the charging coil.

14. The portable terminal charging device of claim 10, wherein a third detection coil is arranged between the first and second detection coils.

15. The portable terminal charging device of claim 10, wherein each of the first and second detection coils is connected to a voltage detector for measuring a peak voltage, and the voltage detector is connected to the controller.

16. An automobile comprising:
the portable terminal charging device of claim 10,
wherein the portable terminal charging device is arranged in an automobile interior so that an upper surface side of the portable terminal charging device serves as the portable terminal installation unit.

17. The automobile of claim 16, wherein a guard unit protruding upward beyond the support plate is disposed on an outer periphery of the support plate.

\* \* \* \* \*